No. 727,637. PATENTED MAY 12, 1903.
E. KAISER.
SLEIGH RUNNER ATTACHMENT FOR VEHICLES.
APPLICATION FILED SEPT. 22, 1902.
NO MODEL.

Witnesses
C. H. Walker.
J. W. Moore.

Inventor
Edward Kaiser
By Eugene H. Johnson
Attorney

No. 727,637. Patented May 12, 1903.

UNITED STATES PATENT OFFICE.

EDWARD KAISER, OF CONGERVILLE, ILLINOIS.

SLEIGH-RUNNER ATTACHMENT FOR VEHICLES.

SPECIFICATION forming part of Letters Patent No. 727,637, dated May 12, 1903.

Application filed September 22, 1902. Serial No. 124,358. (No model.)

*To all whom it may concern:*

Be it known that I, EDWARD KAISER, a citizen of the United States, residing at Congerville, in the county of Woodford and State of Illinois, have invented new and useful Improvements in Sleigh-Runners for Vehicles, of which the following is a specification.

This invention relates to sleigh-runners for vehicles, the object thereof being to provide sleigh-runners of such construction that they may be readily attached to the running-gear of vehicles after the wheels have been removed therefrom and when attached the vehicle to which they are applied may be used as a sleigh, the construction being such as to provide bars and fenders which rigidly connect the axles and runners, which are positioned between the connecting-bars and fenders, as will be hereinafter fully set forth.

Figure 1:
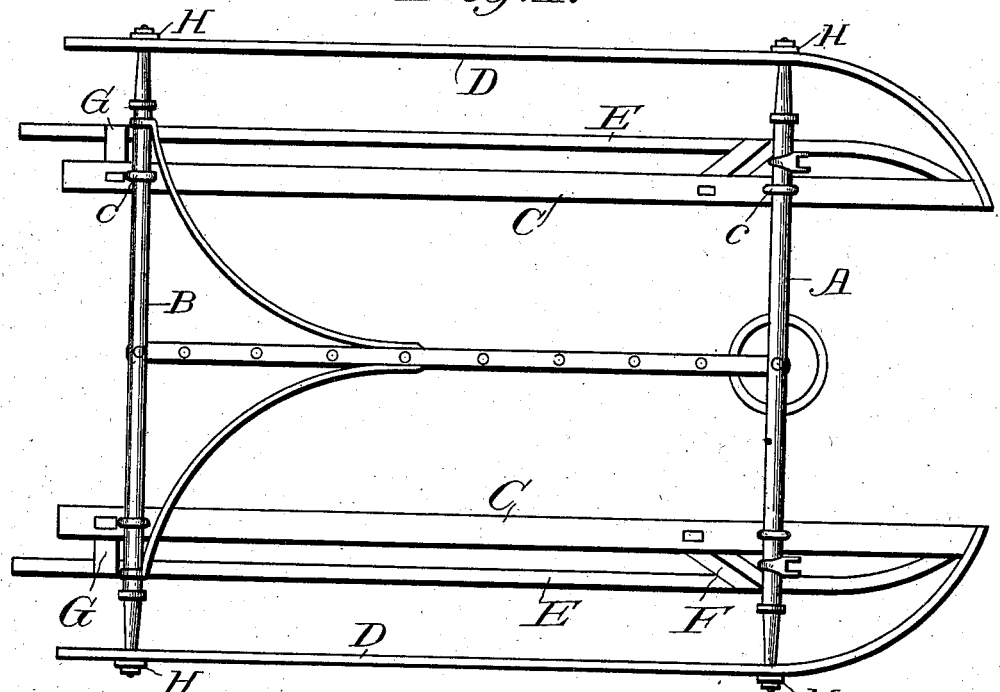
Figure 2:
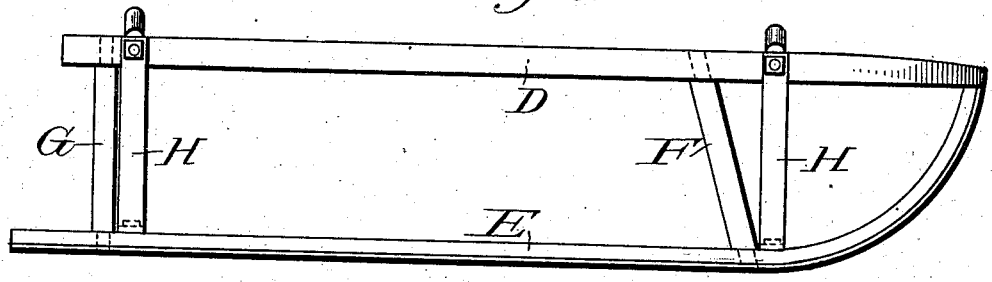
Figure 3:
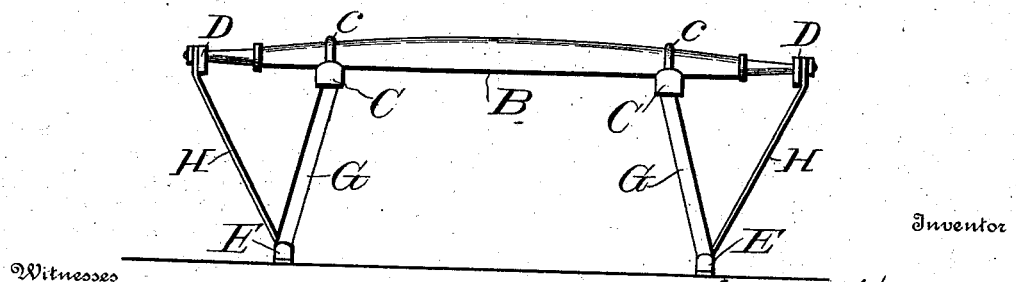

In the accompanying drawings, Figure 1 is a plan view showing sleigh-runners made in accord with my invention and attached to the running-gear of a vehicle. Fig. 2 is a side elevation, and Fig. 3 is an end view.

This invention is applicable to the running-gear of light vehicles, as carriages, buggies, &c., and in the drawings, A refers to the front axle of a vehicle, which is connected to the rear axle B by a reach in the usual manner, and the ends of the axles have spindles which are threaded to receive nuts, which usually hold the wheels thereon.

The runners comprise, practically, three parts—namely, bars C C, fenders D D, and runners E E—which are connected to each other at their forward ends and rear of said ends by standards and braces, as will be hereinafter set forth. The upper edges of the bars C C bear against the under sides of the axles and in practice are connected thereto by clips c, which span the axles and pass through apertures in the bars, the lower ends of the clips being threaded to receive nuts. To the forward ends of the bars C C there are rigidly attached the front ends of the fenders D D, such fenders being bent in the segment of a circle. The straight portions of the fenders are provided with apertures of a size to receive the ends of the spindles and permit the threaded ends of the spindles to project beyond the fenders. The runners E are upturned at their forward ends and are connected to the front ends of the fender and to the bar D, and at points rear of the axles there are standards F and G, which are mortised into the runners and into the bars A, and the front standard may incline, as shown in Fig. 2, so as to better resist the strain to which the runner is subjected.

In vertical line with the axles there are braces H, which are secured to the runners and to the outer sides of the fenders. These braces at their upper ends have openings of a size sufficient to admit the threaded ends of the spindles therethrough, so that the shoulders of the spindles will bear against the braces, they being forced against the same by the axle-nuts when placed on the spindle and tightened.

By the construction shown it will be noted that the runners diverge from the axles outward and are braced not only to the axle-connecting bars A, but also to the fenders. The fenders not only assist in connecting the axles, but also protect the spindles, and in practice axle boxes or tubes may be placed over the spindles. The clips for the draft-pole or shafts are almost immediately above the runners.

The device hereinbefore described may be readily attached, is simple in construction, and may be cheaply manufactured, and the parts where they are connected may be braced in any suitable manner.

Having thus described my invention, what I claim as new, and desire to secure by Letters Patent, is—

A sleigh-runner for attachment to the running-gear of vehicles, comprising runner-bars the forward ends thereof being bent upward to a point on a plane with the axles of the running-gear of a vehicle, fender-bars having inward-bent ends which are rigidly connected to the runner-bars such fender-bars having apertures for engagement with the outer ends of the axle-spindles, bars attached to the forward ends of the runner-bars, clips passed through the bars to engage the front and rear axles of the running-gear, standards connected to the runner-bars and to the bars which are clipped to the axles; the standards being inclined inward and upward, and braces attached to the fender-bars and runner-bars, the points of attachment to the fender-bars being opposite the apertures through which pass the ends of the axle-spindles, the parts being organized as shown, so that the runners are maintained below and midway between the bars and fenders and are braced by the diverging standards and braces.

In testimony whereof I have hereunto set my hand in the presence of two witnesses.

EDWARD KAISER.

In presence of—
P. S. GERBER,
H. R. WISE.